US012664820B2

(12) United States Patent
Ham et al.

(10) Patent No.: US 12,664,820 B2
(45) Date of Patent: Jun. 23, 2026

(54) SYSTEM AND METHOD FOR GENERATING PEDESTRIAN BEHAVIOR PREDICTION INFORMATION

(71) Applicant: ELECTRONICS AND TELECOMMUNICATIONS RESEARCH INSTITUTE, Daejeon (KR)

(72) Inventors: Je-Seok Ham, Daejeon (KR); Dae Hoe Kim, Daejeon (KR); Jinyoung Moon, Daejeon (KR); Sungchan Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 261 days.

(21) Appl. No.: 18/592,497

(22) Filed: Feb. 29, 2024

(65) Prior Publication Data

US 2025/0166415 A1     May 22, 2025

(30) Foreign Application Priority Data

Nov. 20, 2023     (KR) ......................... 10-2023-0160323

(51) Int. Cl.
*G06V 40/20*          (2022.01)
*G06V 10/42*          (2022.01)
(Continued)

(52) U.S. Cl.
CPC .............. *G06V 40/20* (2022.01); *G06V 10/42* (2022.01); *G06V 10/44* (2022.01); *G06V 10/82* (2022.01);
(Continued)

(58) Field of Classification Search
CPC ...... G06V 40/20; G06V 40/10; G06V 40/103; G06V 40/25; G06V 40/23; G06V 10/42;
(Continued)

(56) References Cited

U.S. PATENT DOCUMENTS

2013/0188031 A1     7/2013   Park et al.
2015/0084791 A1     3/2015   Jang
(Continued)

FOREIGN PATENT DOCUMENTS

KR     10-2019-0046317  A     5/2019
KR         102504007  B1     2/2023

OTHER PUBLICATIONS

Ham et al, CIPF: Crossing intention Prediction Network based on Feature Fusion Modules for Improving Pedestrian Safety, 2023, IEEE/CVF Conference on Computer Vision and Pattern Recognition, pp. 1-11. (Year: 2023).*
(Continued)

*Primary Examiner* — Kathleen M Broughton
(74) *Attorney, Agent, or Firm* — Rabin & Berdo, P.C.

(57)          ABSTRACT

A method of generating pedestrian behavior prediction information includes setting image information from present to a certain time in the past as the target observation image, extract multiple visual input feature information and non-visual input feature information from the target observation image, grouping the multiple visual input feature information and non-visual input feature information, and inputting the grouped information to separated processing modules and generating pedestrian behavior prediction information by concatenating output results of the processing modules.

14 Claims, 7 Drawing Sheets

(51) Int. Cl.

| | |
|---|---|
| *G06V 10/44* | (2022.01) |
| *G06V 10/82* | (2022.01) |
| *G06V 20/58* | (2022.01) |
| *G06V 20/70* | (2022.01) |
| *G06V 40/10* | (2022.01) |

(52) U.S. Cl.
CPC .............. *G06V 20/58* (2022.01); *G06V 20/70* (2022.01); *G06V 40/10* (2022.01)

(58) Field of Classification Search
CPC ........ G06V 10/44; G06V 10/82; G06V 20/58; G06V 20/70; G06V 20/52; G08G 1/166; G08G 1/0175; G08G 1/052; G06T 7/11; G06T 2210/12
See application file for complete search history.

(56) References Cited

U.S. PATENT DOCUMENTS

| | | | |
|---|---|---|---|
| 2018/0189572 A1 | 7/2018 | Hori et al. | |
| 2019/0176820 A1 | 6/2019 | Pindeus et al. | |
| 2021/0070322 A1* | 3/2021 | Noy | G06N 3/08 |
| 2021/0103742 A1 | 4/2021 | Adeli-Mosabbeb et al. | |
| 2021/0192748 A1* | 6/2021 | Morales Morales .. | G06N 3/044 |
| 2021/0357662 A1 | 11/2021 | Hartmann et al. | |
| 2022/0242453 A1* | 8/2022 | Hahn | G06N 3/09 |
| 2022/0413507 A1* | 12/2022 | Li | G01S 17/89 |
| 2023/0150550 A1 | 5/2023 | Shi et al. | |
| 2025/0037469 A1* | 1/2025 | Oh | G06V 10/7715 |

OTHER PUBLICATIONS

Lorenzo et al, IntFormer: Predicting pedestrian intention with the aid of the Transformer architecture, 2021, arXiv:2105.08647v1, pp. 1-5. (Year: 2021).*

Singh et al, Multi-Input Fusion for Practical Pedestrian Intention Prediction, 2021, IEEE/CVF International Conference on Computer Vision, pp. 1-9. (Year: 2021).*

Achaji et al, Is attention to bounding boxes all you need for pedestrian action prediction?, 2022, IEEE Intelligent Vehicles Symposium, pp. 1-9. (Year: 2022).*

Cao et al, Box-level segmentation supervised deep neural networks for accurate and real-time multispectral pedestrian detection, 2019, ISPRS J. Photogrammetry and Remote Sensing, 150(2019): 70-79. (Year: 2019).*

Yang et al, Predicting Pedestrian Crossing Intention with Feature Fusion and Spatio-Temporal Attention, 2022, IEEE Transactions on Intelligent Vehicles, 7(2): 221-230. (Year: 2022).*

Je-Seok Ham, et al., "CIPF: Crossing Intention Prediction Network based on Feature Fusion Modules for Improving Pedestrian Safety", 2023 IEEE/CVF Conference on Computer Vision and Pattern Recognition Workshops (CVPRW), Jun. 17-24, 2023, pp. 3665-3674.

* cited by examiner

——— : SAFE PEDESTRIAN
········· : VULNERABLE PEDESTRIAN

FIG. 8

— : SAFE PEDESTRIAN
------ : VULNERABLE PEDESTRIAN

SYSTEM AND METHOD FOR GENERATING PEDESTRIAN BEHAVIOR PREDICTION INFORMATION

CROSS-REFERENCE TO RELATED APPLICATION

This application claims priority to and the benefit of Korean Patent Application No. 10-2023-0160323, filed on Nov. 20, 2023, the disclosure of which is incorporated herein by reference in its entirety.

BACKGROUND

1. Technical Field

The present disclosure relates to a system and method for generating pedestrian behavior prediction information.

2. Related Art

Figure 1:
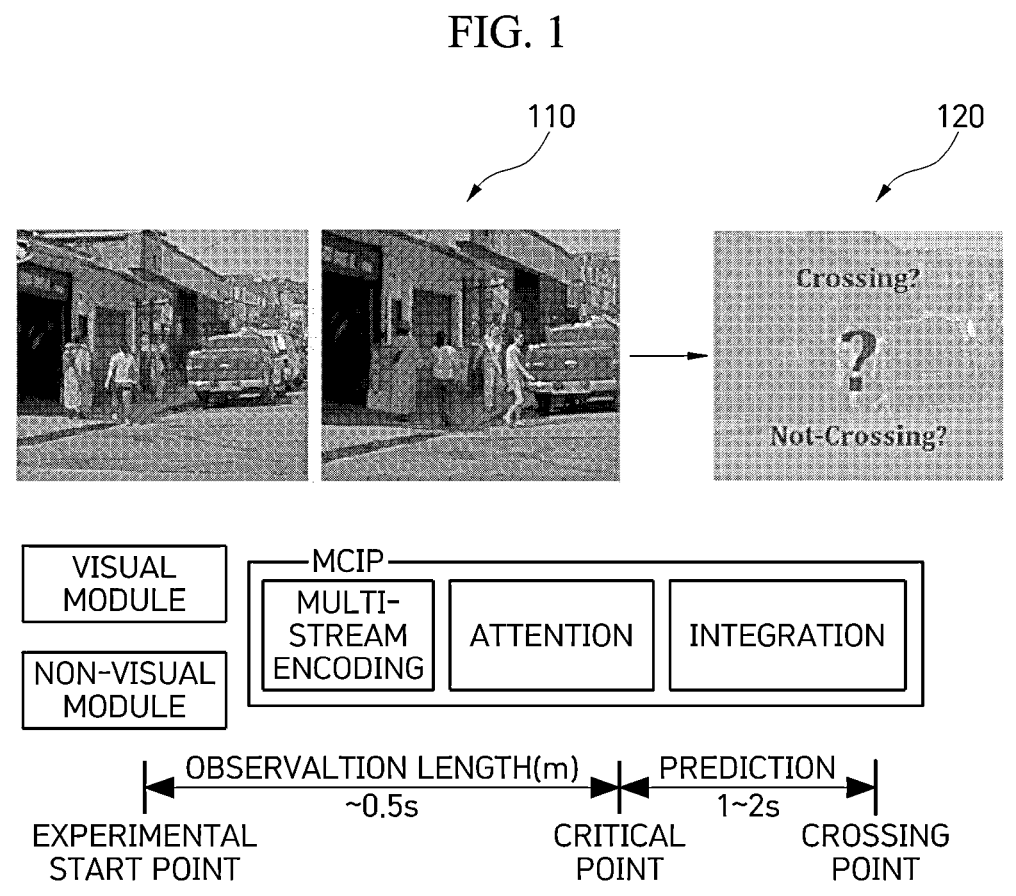

FIG. 1 is a diagram for describing contents of predicting whether a pedestrian intends to cross a road from a vehicle.

Recently, as the development of a vehicle technology, such as autonomous driving, is accelerated, various researches for increasing the safety of a pedestrian within a road are carried out in accordance with the development of the vehicle technology. Particularly, researches for predicting whether a pedestrian will cross or not cross a road or a crosswalk in advance by using input feature information corresponding to a specific past frame intervals, are representative technology.

Referring to FIG. 1, observation is performed up to a critical point "t" prior to m frames (means the number of observation frames) on the basis of the critical point "t" (110). After various input features are extracted from the observation, the inputs are divided in accordance with corresponding features and are processed in deep learning module networks. Furthermore, whether a pedestrian will cross or not cross a road or a crosswalk is predicted after the n frames by combining the results of each modules (120).

However, in current researches, networks that efficiently fuse various input features are insufficient. Furthermore, there are difficulties in expanding the current researches to research for increasing the safety of a pedestrian. Particularly, the existing researches have a problem in that they have a slow processing speed because the existing researches are based on a model based on long short-term memory (LSTM) or have a limit in fusing more than 5 input features because the existing researches are based on models capable of using only 4 to 5 input features. Furthermore, in order to practically apply the corresponding researches to a school zone or a smart safety road system, the corresponding researches need to be expanded to research of the safety of a pedestrian. In this case, additional consideration for the safety of a pedestrian is insufficient.

SUMMARY

Various embodiments are directed to providing a system and method for generating pedestrian behavior prediction information, which can predict a behavior of a pedestrian through an artificial intelligence model that efficiently fuses multiple visual and non-visual input features in order to increase the safety of the pedestrian by predicting a pedestrian in a risk-vulnerable situation within a road in advance.

However, objects of the present disclosure to be achieved are not limited to the aforementioned object, and other objects may be present.

A method of generating pedestrian behavior prediction information according to a first aspect of the present disclosure includes setting image information from present to a certain time in the past as the target observation image, extracting multiple visual input feature information and non-visual input feature information from the target observation image, grouping the multiple visual input feature information and non-visual input feature information, and inputting the grouped feature information to separated processing modules and generating pedestrian behavior prediction information by concatenating output results of the processing modules.

A system for generating pedestrian behavior prediction information according to a second aspect of the present disclosure includes a communication module configured to receive image information obtained through a camera, memory in which a program for generating pedestrian behavior prediction information based on the image information has been stored, and a processor configured to set image information during a predetermined frame from a present to a past as an target observation image, extract multiple visual input feature information and non-visual input feature information from the target observation image, group the multiple visual input feature information and non-visual input feature information, and input the grouped feature information to separated processing modules and generating pedestrian behavior prediction information by concatenating output results of the processing modules, by executing the program stored in the memory.

A computer program according to another aspect of the present disclosure executes the method of generating pedestrian behavior prediction information in combination with a computer, that is, hardware, and is stored in a computer-readable recording medium.

Other details of the present disclosure are included in the detailed description and the drawings.

According to the aforementioned embodiment of the present disclosure, behaviors of pedestrians who are vulnerable to safety can be predicted in advance based on various past frame input information. Particularly, pedestrians who are vulnerable to safety can be predicted with high accuracy through the learning of a network capable of extracting input information in accordance with features and performing efficient prediction.

Furthermore, resources and time can be reduced by improving efficiency of a data collection and labeling process through an automatic labeling technology.

As described above, the embodiments of the present disclosure may be expected to play an important role in the road safety and traffic accident prevention fields, can create a safe road environment, and can contribute to a reduction of traffic accidents by introducing an innovative model in a pedestrian behavior prediction technology.

Effects of the present disclosure are not limited to the aforementioned effects, and other effects not described above may be evidently understood by a person having ordinary knowledge in the art from the following description.

BRIEF DESCRIPTION OF THE DRAWINGS

FIG. 1 is a diagram for describing contents of predicting whether a pedestrian intends to cross a road from a vehicle.

FIG. 6 is a diagram for describing a detailed operation of each processing module for performing the method of generating pedestrian behavior prediction information according to an embodiment of the present disclosure.

FIG. 7 is a diagram for describing qualitative analysis results of pedestrian prediction results based on an image captured by CCTV in an embodiment of the present disclosure.

FIG. 8 is a diagram for describing qualitative analysis results of pedestrian prediction results based on an image captured in a vehicle in an embodiment of the present disclosure.

DETAILED DESCRIPTION

Figure 2:
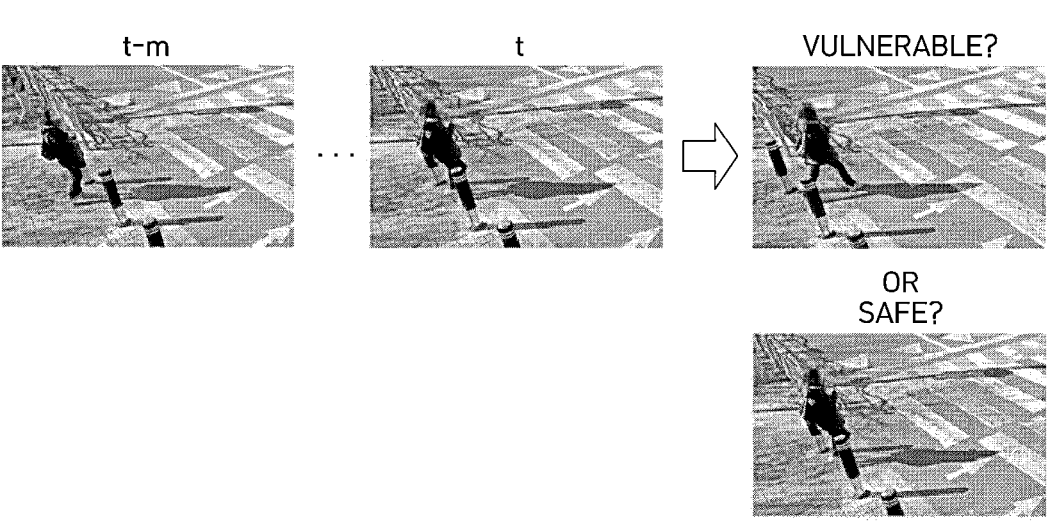
FIG. 2 is a diagram for describing a concept in which behavior prediction information of a pedestrian is generated according to an embodiment of the present disclosure.
Figure 2:
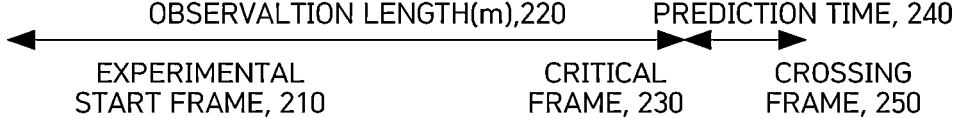

Advantages and characteristics of the present disclosure and a method for achieving the advantages and characteristics will become apparent from the embodiments described in detail later in conjunction with the accompanying drawings. However, the present disclosure is not limited to embodiments disclosed hereinafter, but may be implemented in various different forms. The embodiments are merely provided to complete the present disclosure and to fully notify a person having ordinary knowledge in the art to which the present disclosure pertains of the category of the present disclosure. The present disclosure is merely defined by the claims.

Terms used in this specification are used to describe embodiments and are not intended to limit the present disclosure. In this specification, an expression of the singular number includes an expression of the plural number unless clearly defined otherwise in the context. The term "comprises" and/or "comprising" used in this specification does not exclude the presence or addition of one or more other elements in addition to a mentioned element. Throughout the specification, the same reference numerals denote the same elements. "And/or" includes each of mentioned elements and all combinations of one or more of mentioned elements. Although the terms "first", "second", etc. are used to describe various components, these elements are not limited by these terms. These terms are merely used to distinguish between one element and another element. Accordingly, a first element mentioned hereinafter may be a second element within the technical spirit of the present disclosure.

All terms (including technical and scientific terms) used in this specification, unless defined otherwise, will be used as meanings which may be understood in common by a person having ordinary knowledge in the art to which the present disclosure pertains. Furthermore, terms defined in commonly used dictionaries are not construed as being ideal or excessively formal unless specially defined otherwise.

FIG. 2 is a diagram for describing a concept in which behavior prediction information of a pedestrian is generated according to an embodiment of the present disclosure.

First, a frame prior to m frames inversely on the basis of a critical frame "t" 230 is defined as an experimental start frame 210. Observation is started from the experimental start frame 210 and performed up to the critical frame "t". This is defined as an observation length "m" 220. During the observation length, observation information is collected.

Furthermore, it is predicted whether a pedestrian is safe in the future, that is, the pedestrian will be in a situation in which the pedestrian is vulnerable to a risk or will not be in the situation, in the critical frame "t" 230 on the basis of the observation information in the past frame. Timing at which a prediction time 240 is ended is defined as a crossing frame 250. Accordingly, the prediction time starts from the critical frame and continues up to the crossing frame.

If a model predicts that the pedestrian will be in the situation in which the pedestrian is vulnerable to safety in the critical frame and the pedestrian is actually in the situation in which the pedestrian is vulnerable to safety in the crossing frame, this corresponds to a case in which the model has correctly predicted the situation. In contrast, if the pedestrian is actually in a situation in which the pedestrian is not vulnerable to safety in the critical frame, this corresponds to a case in which the model has not correctly predicted the situation.

Prediction accuracy is determined based on a ratio of such samples, which is represented as in Equation 1.

$$Accuracy = \frac{TP + TN}{TP + TN + FP + FN} \qquad \text{[Equation 1]}$$

In Equation 1, TP means true positive, TN means true negative, FP means false positive, and FN means false negative. TP indicates a case in which the model has predicted that a pedestrian will be at risk and has been actually at risk. TN indicates a case in which the model has predicted that the pedestrian will be safe and has been actually safe. FP indicates a case in which the model has predicted that the pedestrian will be at risk, but the pedestrian has not been actually at risk. FN indicates a case in which the model has predicted that the pedestrian will be safe, but the pedestrian has been actually at risk.

Figure 3:
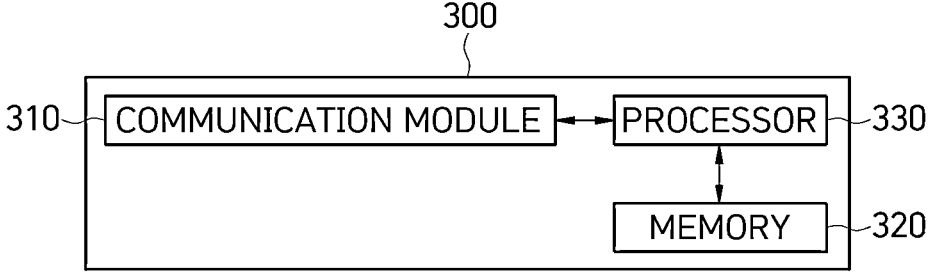
FIG. 3 is a block diagram of a system for generating pedestrian behavior prediction information according to an embodiment of the present disclosure.

FIG. 3 is a block diagram of a system for generating pedestrian behavior prediction information according to an embodiment of the present disclosure.

The system 300 for generating pedestrian behavior prediction information according to an embodiment of the present disclosure includes a communication module 310, memory 320, and a processor 330.

The communication module 310 receives image information obtained through a camera. The communication module 310 may include both a wired communication module and a wireless communication module. The wired communication module may be implemented as a power line communication device, a telephone line communication device, cable home (MoCA), Ethernet, IEEE1294, an integrated wired home network, or an RS-485 controller. Furthermore, the wireless communication module may be constructed as a module for implementing a function, such as a wireless LAN (WLAN), Bluetooth, an HDR WPAN, UWB, ZigBee, impulse radio, a 60 GHz WPAN, binary-CDMA, a wireless USB technology, a wireless HDMI technology, $5^{th}$ generation (5G) communication, long term evolution-advanced (LTE-A), long term evolution (LTE), or wireless fidelity (Wi-Fi).

The memory 320 stores a program for generating pedestrian behavior prediction information based on image information. The memory 320 commonly refers to a nonvolatile storage device that retains information stored therein although power is not supplied to the nonvolatile storage device and a volatile storage device. For example, the memory 120 may include NAND flash memory such as a compact flash (CF) card, a secure digital (SD) card, a memory stick, a solid-state drive (SSD), and a micro SD card, a magnetic computer memory device such as a hard disk drive (HDD), and an optical disc drive such as CD-ROM and DVD-ROM.

The processor 330 may control at least another component (e.g., a hardware or software component) of the system 300 for generating pedestrian behavior prediction information by executing software, such as a program, and may perform various data processing or operations.

In an embodiment of the present disclosure, the processor 330 may use at least one of machine learning, a neural network, or a deep learning algorithm, as an artificial intelligence (AI) algorithm for generating pedestrian behavior prediction information. Examples of the neural network may include a model, such as a convolutional neural network (CNN), a deep neural network (DNN), or a recurrent neural network (RNN).

In an embodiment of the present disclosure, AI may mean a technology for imitating the learning ability, inference ability, and perception ability of a human and implementing the abilities by using a computer. AI may basically include machine learning to an element technology using machine learning. Machine learning may mean an algorithm for extracting at least one feature of learning data in order to classify input data. Furthermore, technologies for imitating functions of a human brain, such as the judgment and recognition of the human brain, by using the machine learning algorithm may also be understood as the category of AI. AI may include technical fields, such as linguistic understanding, visual understanding, inference/prediction, knowledge representation, and operation control.

In an embodiment of the present disclosure, the artificial neural network may be designed to implement a brain structure of a human on a computer, and may include a plurality of network nodes that schemes a neuron of a neural network of a human and that has a weight. The plurality of network nodes may scheme the synaptic activities of a neuron that exchanges signals through a synapse, and may have a connection relation therebetween. In the artificial neural network, a plurality of network nodes may be disposed in layers having different depths, and may exchange data based on a convolution connection relation therebetween. The artificial neural network may be a convolution neural network, for example.

In the present disclosure, the artificial neural network is a model that has been trained according to a predetermined machine learning method, and may mean a model in which a weight for at least one network node included in a model that has not been trained has been determined by machine learning. Machine learning may mean that computer software improves the data processing ability through learning using data and data processing experiences. The artificial neural network has been constructed by modeling a correlation between data. The correlation may be represented by a plurality of parameters. The artificial neural network derives the correlation between data by extracting and analyzing features from given data. Optimizing parameters of the artificial neural network by repeating such a process may be said to be machine learning. For example, the artificial neural network may learn mapping (i.e., a correlation) between an input and an output with respect to data that are and given as input output pairs. Alternatively, the artificial neural network may learn a relation between given data by deriving regularity between the given data although only input data are given. In the present disclosure, the "artificial neural network" may be interchangeably used with an "artificial neural network model" or an "AI algorithm".

Hereinafter, a method that is performed by the system 300 for generating pedestrian behavior prediction information according to an embodiment of the present disclosure is described with reference to FIGS. 4 to 6.

Figure 4:
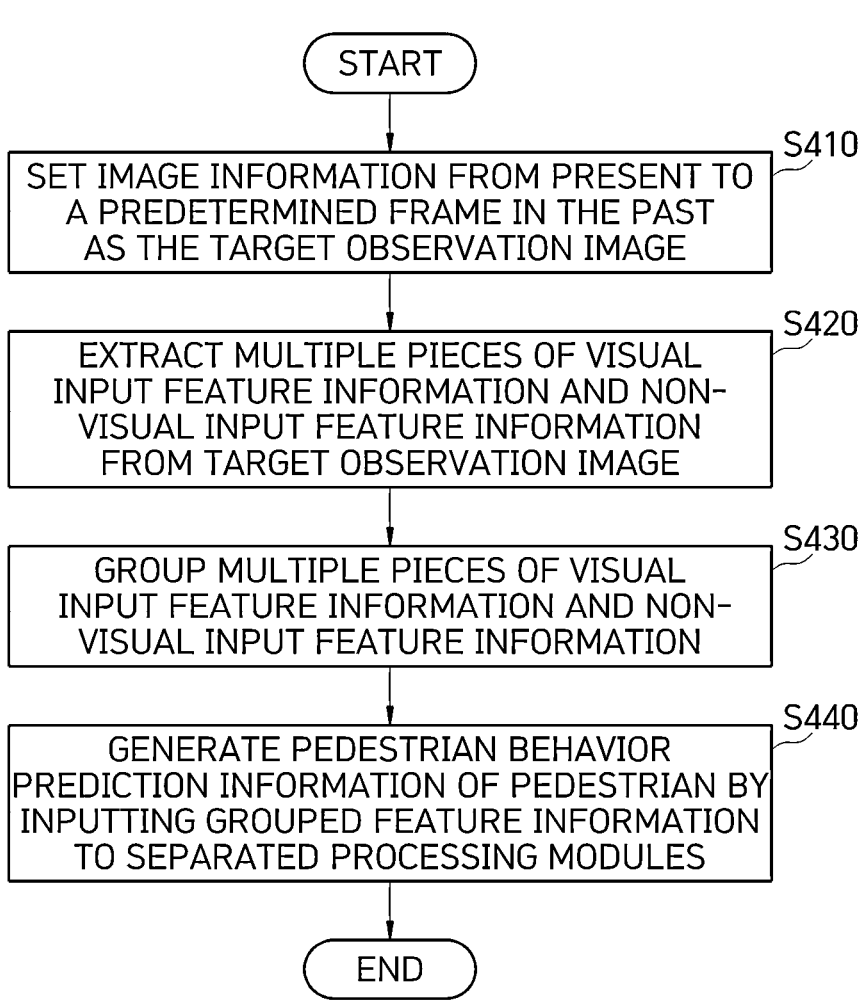
FIG. 4 is a flowchart of a method of generating pedestrian behavior prediction information according to an embodiment of the present disclosure.

FIG. 4 is a flowchart of a method of generating pedestrian behavior prediction information according to an embodiment of the present disclosure.

The of generating method pedestrian behavior prediction information according to an embodiment of the present disclosure includes step S410 of setting image information from the present to a certain time in the past as an target observation image, step S420 of extracting multiple visual input feature information and non-visual input feature information from the target observation image, step S430 of grouping the multiple visual input feature information and non-visual input feature information, and step S440 of generating pedestrian behavior prediction information by inputting the grouped feature information to separated processing modules and concatenating output results of the processing modules.

Figure 5:
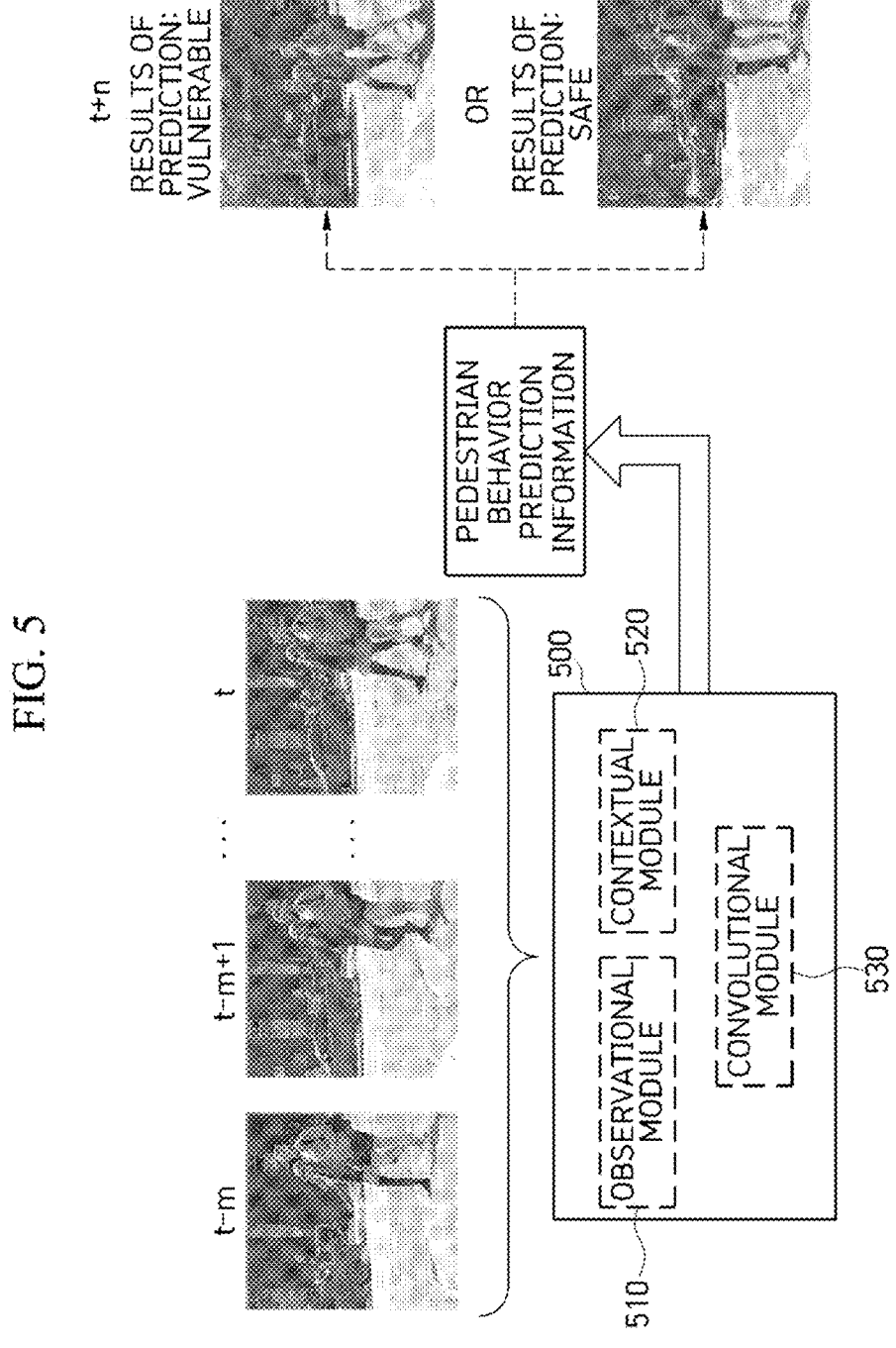
FIG. 5 is a diagram for describing each processing module for performing the method of generating pedestrian behavior prediction information according to an embodiment of the present disclosure.

FIG. 5 is a diagram for describing each processing module for performing the method of generating pedestrian behavior prediction information according to an embodiment of the present disclosure. FIG. 6 is a diagram for describing a detailed operation of each processing module for performing the method of generating pedestrian behavior prediction information according to an embodiment of the present disclosure.

First, referring to FIG. 5, in an embodiment of the present disclosure, image information during a predetermined frame "t-m" from a critical frame "t" to the past is set as an observation target (S410). That is, the frame "t-m" to the critical frame "t" is set as a target observation image.

Next, multiple visual input feature information and non-visual input feature information are extracted from the target observation image (S420). The multiple input feature information are grouped according to their attributes (S430).

Furthermore, the grouped feature information are input to separated processing modules 500. In this case, in an embodiment of the present disclosure, the processing modules may include an observational module 510, a contextual module 520, and a convolutional module 530.

Accordingly, non-visual features are input and processed by the observational module 510. Furthermore, visual features including a context feature are input and processed by the contextual module 520 consisting of a CNN and an RNN, and are processed by the convolutional module 530 consisting of a 3-D convolutional network, 3-D max pooling, a flatten layer, and a fully connected (FC) layer.

Thereafter, behavior prediction information of a pedestrian after n frame may be generated by concatenating output results of the three processing modules (S440).

Figure 6:
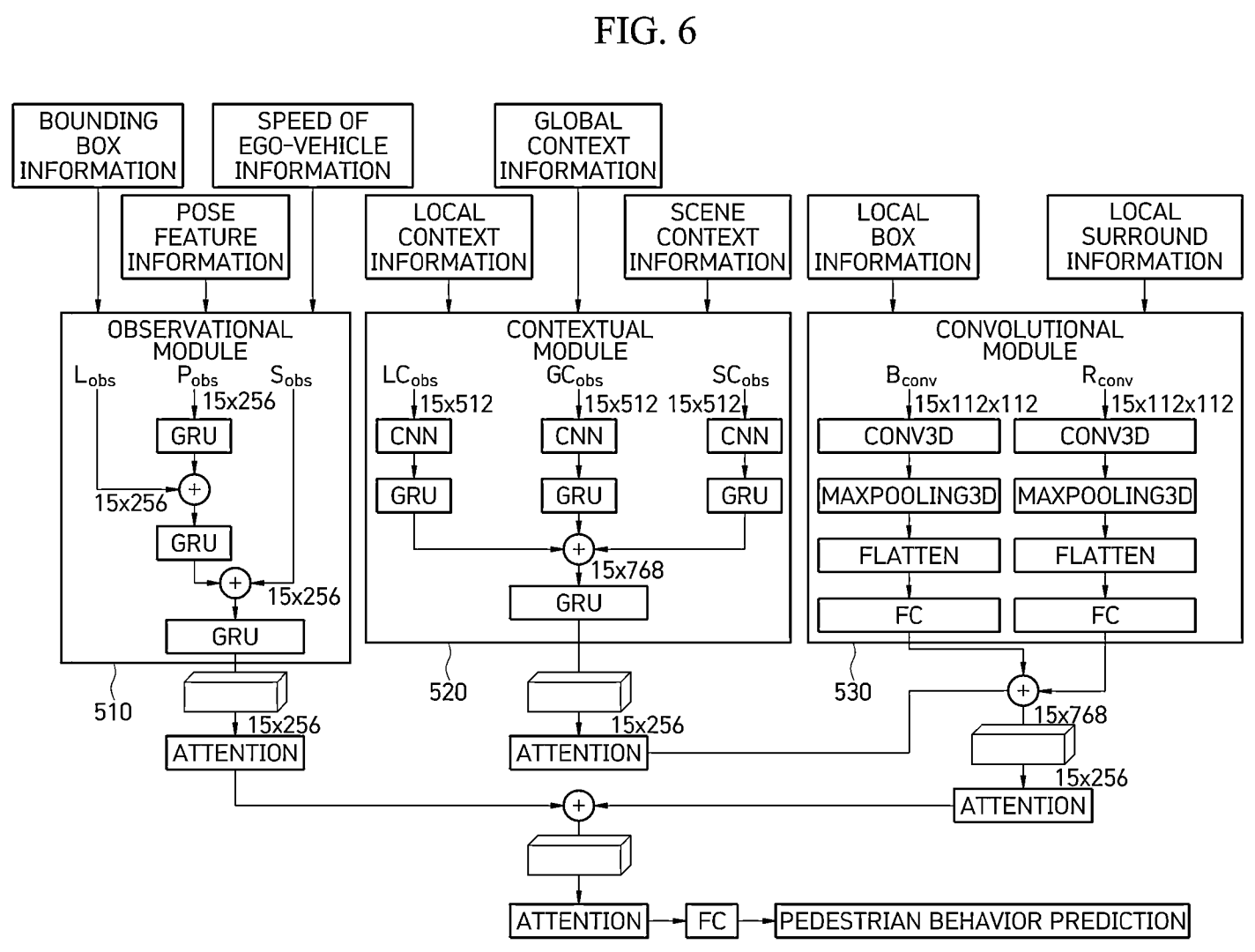

Referring to FIG. 6, in an embodiment of the present disclosure, visual input feature information and non-visual input feature information are classified and processed according to their features.

As an embodiment, the visual input feature information may include local context information, which is an image with a size that is a certain multiple of the bounding box information, global context information including image segmentation information, scene context information including the entire area information of an image, local box information obtained from the image information, and local surround information from which the local box has been removed.

As an embodiment, the non-visual input feature information may include pose feature information of a pedestrian, bounding box information of the pedestrian, and speed of an ego-vehicle information.

The visual input feature information and the non-visual input feature information are grouped and input to the processing modules.

To this end, in an embodiment of the present disclosure, the pose feature information of the pedestrian, the bounding box information of the pedestrian, and the speed of an ego-vehicle information may be generated as first group feature information. Furthermore, the local context information, which is an image with a size that is a certain multiple of the bounding box information, the global context information including the image segmentation information, the scene context information including the entire area information of the image may be generated as second group feature information. Furthermore, the local box information obtained from the image information and the local surround information from which the local box has been removed may be generated as third group feature information.

After the grouping, the first group feature information is input to the observational module 510, the second group feature information is input to the contextual module 520, and the third group feature information is input to the convolutional module 530.

First, the first group feature information that is processed by the observational module 510 is non-visual input feature information, and the pose feature information of the pedestrian, the bounding box information of the pedestrian, and the speed of an ego-vehicle information are input to the observational module 510.

The pose feature information of the pedestrian may be defined like Equation 2.

$$P_{obs} = \left\{ p_i^{t-m}, p_i^{t-m+1}, \dots, p_i^t \right\}$$ [Equation 2]

In Equation 2, m means an observation length. For example, the pose feature information of the pedestrian may include pose feature information of a human, which is extracted based on 18 joints (e.g., a mouth, a neck, a shoulder, an elbow, a wrist, a hip, a knee, an ankle, eyes, and ears) by using Openpose. The 18 key points are represented as 36D vectors. Each of the key points includes 2-D coordinates.

The pose feature information of the pedestrian is input to a first gate recurrent unit (GRU) module. A dynamic feature value of the pose feature information of the pedestrian is obtained from the first GRU module.

The bounding box information of the pedestrian may be defined like Equation 3.

$$L_{obs} = \left\{ l_i^{t-m}, l_i^{t-m+1}, \dots, l_i^t \right\}$$ [Equation 3]

In Equation 3, $l_i=[x_1, y_1, x_2, y_2] \in \mathbb{R}^4$ may be determined by coordinates ([$(x_1, y_1)$] of each pedestrian on the upper left side thereof and coordinates ([$(x_2, y_2)$]) of each pedestrian on the lower right side thereof. The dimension of $L_{obs}$ becomes m×4 because the bounding box information consists of four coordinates.

The bounding box information of the pedestrian is concatenated with the dynamic feature value of the pose feature information of the pedestrian, which has been obtained from the first GRU module, and is input to a second GRU module. A dynamic feature value, that is, the results of an operation of the bounding box information and pose feature information of the pedestrian, may be obtained from the second GRU module.

Next, the vehicle speed information may be defined like Equation 4.

$$S_{obs} = \left\{ s_i^{t-m}, s_i^{t-m+1}, \dots, s_i^t \right\}$$ [Equation 4]

In Equation 4, $s_i$ means the speed of an ego-vehicle. The input feature experiences a process of obtaining data through a sensor installed within the ego-vehicle.

The vehicle speed information is concatenated with the dynamic feature value obtained from the second GRU module and is input to a third GRU module. A dynamic feature value, that is, the results of an operation of the bounding box information and pose feature information of the pedestrian and the speed information of the ego-vehicle, may be obtained from the third GRU module.

The second group feature information that is processed by the contextual module 520 includes three image inputs, and includes local context information (local context), global context information (global context), and scene context information (scene context). Image features are extracted from the context inputs by using a VGG19 network that has been pre-trained in ImageNet as the backbone of a CNN. The features output by the CNN are processed by using the first to third GRU modules. After the outputs of the first to third GRU modules are concatenated, the outputs are fused into one output and input to a fourth GRU module. An attention mechanism is applied to the outputs.

First, the local context information may be defined like Equation 5.

$$LC_{fex} = \left\{ lc_i^{t-m}, lc_i^{t-m+1}, \dots, lc_i^t \right\}$$ [Equation 5]

An image around a pedestrian, including a crosswalk, a signal light, or traffic signs, is an essential element in predicting a behavior of the pedestrian. Accordingly, $lc_i$ is an image corresponding to a predetermined multiple (e.g., 1.5 times) size of the bounding box information of the pedestrian. An RGB image is used by being cut into 224×224 pixels. An input feature vector is extracted as (m, 512). Furthermore, the input feature vector is processed by the max pooling layer of a 14×14 kernel and reduced in size as a (m, 256) vector.

Equation 6 defines the input of the global context information.

$$GC_{fex} = \left\{ gc_i^{t-m}, gc_i^{t-m+1}, \dots, gc_i^t \right\}$$ [Equation 6]

In Equation 6, $gc_i$ is the extraction of semantic segmentation results from a Cityscapes dataset using a pre-trained DeepLabV3 model. The extracted semantic map values are utilized to identify the overall scene and road information. As in the local context information, the features are extracted as (m, 256) vectors and concatenated.

The input of the scene context information may be defined like Equation 7.

$$SC_{fex} = \left\{ sc_i^{t-m}, sc_i^{t-m+1}, \ldots, sc_i^{t} \right\}$$ [Equation 7]

In Equation 7, $sc_i$ means the entire image in addition to the pedestrian or an image around the pedestrian. As in other contextual features, the entire image has been resized as 224×224 pixels, and is processed by a (14, 14) kernel and fused with other contextual features.

Finally, the convolutional module receives pedestrian area information (local box) and surrounding area information (local surround) from which the local box information has been removed. The two inputs are input to a convolution 3-D network (C3D). Furthermore, in the output results of the convolution 3-D network, the dimension of each image is repeatedly reduced to 112→56→ . . . →4 through the max pooling layer. Each of the images having the reduced dimensions is converted into 1D vectors by the flatten layer and transferred to the fully connected (FC) layer. The results of the concatenation of input and output neurons are output.

The local box information may be defined like Equation 8.

$$B_{conv} = \left\{ b_i^{t-m}, b_i^{t-m+1}, \ldots, b_i^{t} \right\}$$ [Equation 8]

In Equation 8, $b_i$ means an image feature that is generated by cropping the image in the same size as the bounding box information, performing padding processing on the cropped image, and resizing a long portion of the cropped image in accordance with a desired output size. The remaining part of the image is padded with zeros. Thereafter, the last output of the feature passes through five C3D networks each having the max pooling layer, and then passes through the flatten layer. The last output is resized so that the last output can be fused with other features.

The local surround information from which the local box information has been removed may be defined like Equation 9.

$$R_{conv} = \left\{ r_i^{t-m}, r_i^{t-m+1}, \ldots, r_i^{t} \right\}$$ [Equation 9]

In Equation 9, $r_i$ means an image that is obtained by cropping the image in a predetermined size (e.g., 1.5 times) of the bounding box as in the local context information, but that is obtained by graying out an area corresponding to the bounding box information in order to use only context around the bounding box information. This enables local surround information of the pedestrian to be used. The C3D network performs the same action as that of the local box information so that output values thereof are subsequently concatenated with the image.

Thereafter, in an embodiment of the present disclosure, output results of a first processing module for processing the first group information are input to a first attention module. Output results of a second processing module for processing the second group information are input to a second attention module. Furthermore, output results of the second attention module are concatenated with the third group information module are concatenated with the third group information and then input to a third attention module. Pedestrian behavior prediction information may be generated by concatenating the output results of the first to third attention modules and then inputting the concatenated results to a fourth attention module.

In an embodiment of the present disclosure, in order to consider temporal context of input features, a Gated Recurrent Unit (GRU) module was used, which is known to be a simpler and more efficient structure than LSTM. By a recursive action for a GRU method, variables in a $j^{th}$ level of a stack are defined like Equation 10.

$$z_j^t = \sigma\left( x_j^t W_j^{xz} + h_j^{t-1} W_j^{hz} + b_j^z \right)$$ [Equation 10]

$$r_j^t = \sigma\left( x_j^t W_j^{xr} + h_j^{t-1} W_j^{hr} + b_j^r \right)$$

$$\tilde{h}_j^t = \tanh\left( x_j^t W_j^x + \left( r_j^t \odot h_j^{t-1} \right) W_j^h \right) + b$$

$$h_j^t = \left( 1 - z_j^t \right) \odot h_j^{t-1} + z_j^t \odot \tilde{h}_j^t$$

In Equation 10, $\sigma(\bullet)$ means a logistic sigmoid function, and $$x_j^t$$

means an input feature in a time step "t". W is a weight between two units.

$$r_j^t \text{ and } z_j^t$$

correspond to a reset gate and an update gate, respectively, in the time step "t".

$$h_j^{t-1} \text{ and } h_j^t$$

mean hidden states in an experimental start frame step and a critical frame step, respectively.

Next, the attention mechanism has been adopted to focus a specific portion of the input feature, and is more suitable for analyzing the input feature. An output vector of the attention module may be defined like Equation 11.

$$\beta_{attention} = \tanh\left( W_c \left[ h_c : h_m \right] \right)$$ [Equation 11]

$$h_c = \sum_{s^t} \alpha_t h_{s^t}$$

In Equation 11, $W_c$ means a weight matrix. m means the observation length. $h_m$ means the last hidden state of an encoder. $h_c$ is the sum of the hidden states to which all attention weights have been applied.

$$h_s^t$$

is a previous hidden state of the encoder. $\alpha_t$ is an attention weight vector. In this case, the attention weight vector may be defined like Equation 12.

$$\alpha_t = \frac{\exp\left(\text{score}\left(h_m, \tilde{h}_s\right)\right)}{\sum_{s'=1}^{T} \exp\left(\text{score}\left(h_m, \tilde{h}_{s'}\right)\right)}$$

[Equation 12]

In Equation 12, score $$\left(h_m, h_{s^t}\right) = h_m^T W_p h_s$$

means a content-based function. $W_p$ means a weight matrix which may be learnt.

Furthermore, in an embodiment of the present disclosure, whether the pedestrian is at risk may be automatically labeled with respect to all the frames of the image information based on the generated behavior prediction information of the pedestrian. That is, in an embodiment of the present disclosure, an automatic labeling method may be applied to a dataset for the addition and expansion of the dataset.

There is a limit in that only an interval including annotation may be predicted because annotation included in the existing dataset is not labeled with respect to all frames. Accordingly, there is a problem in that prediction accuracy is reduced because some intervals cannot be predicted or some missing intervals occur.

In order to solve the problem, in an embodiment of the present disclosure, the automatic labeling method capable of automatically labeling all frames is applied. That is, whether a pedestrian is in a sidewalk or a roadway in an image is identified. The pedestrian is mapped as a pedestrian who is safe when the pedestrian is in the sidewalk, and is mapped as a pedestrian who is not safe when the pedestrian is in the roadway. Such information may be added to annotation and used in a prediction process.

Accordingly, in an embodiment of the present disclosure, labeling can be rapidly performed on a large amount of data of an image. Furthermore, there is an advantage in that the consistency of labeling can be maintained because the labeling is not performed based on a person's subjectivity or judgment, but is performed on the basis of a sidewalk and a roadway. Furthermore, there are advantages in that performance is improved and training is very easy because labeling can be rapidly performed on even a new image.

Furthermore, in an embodiment of the present disclosure, all pedestrians within an image can be tracked in real time by applying and expanding a byte track technology based on behavior prediction information of a pedestrian. These tracking results can be reconstructed and verified through the video.

In the case of the existing methods, although multiple pedestrians appear in an image, a form in which prediction is performed on only one pedestrian and prediction is sequentially performed on other pedestrians may be applied.

In contrast, in an embodiment of the present disclosure, prediction can be simultaneously performed on several pedestrians in real time, and the results of the prediction can be provided by displaying the results as a bounding box within video.

In the aforementioned description, each of steps S410 to S440 may be further divided into additional steps or the steps may be combined into smaller steps depending on an implementation example of the present disclosure. Furthermore, some of the steps may be omitted, if necessary, and the sequence of the steps may be changed. Furthermore, the contents described with reference to FIGS. 2 and 3 and the contents described with reference to FIGS. 4 to 6 may be mutually applied.

Hereinafter, effects of the system and method for generating pedestrian behavior prediction information according to an embodiment of the present disclosure are described in detail through the results of tests of the system and method with reference to FIGS. 7 and 8.

The results of comparing pedestrian prediction performance through the system and method proposed in an embodiment of the present disclosure are described. Representatively, the results of comparisons between pedestrian prediction performance of the system and method of the present disclosure and pedestrian prediction performance of the existing other benchmark models in a PIE dataset, that is, a dataset that is used for pedestrian prediction, are listed in Table 1.

TABLE 1

| Model | Visual Encoder | Features | ACC | AUC | F1 | Accuracy | Recall |
|---|---|---|---|---|---|---|---|
| SingleRNN | VGG + GRU | P, L, S, B, R | 0.76 | 0.64 | 0.45 | 0.63 | 0.36 |
| MultiRNN | VGG + GRU | P, L, S, B | 0.86 | 0.80 | 0.73 | 0.80 | 0.67 |
| SFRNN | VGG + GRU | P, L, S, B, R | 0.83 | 0.77 | 0.68 | 0.72 | 0.64 |
| PCPA | C3D + GRU | P, L, S, LC | 0.86 | 0.85 | 0.77 | 0.70 | 0.85 |
|  | I3D + GRU | P, L, S, LC | 0.87 | 0.86 | 0.79 | 0.75 | 0.84 |
|  | VGG + GRU | P, L, S, LC | 0.87 | 0.86 | 0.77 | 0.75 | 0.79 |
| MCIP | C3D + GRU | P, L, S, LC, GC | 0.86 | 0.86 | 0.78 | 0.72 | 0.85 |
|  | I3D + GRU | P, L, S, LC, GC | 0.85 | 0.81 | 0.74 | 0.76 | 0.71 |
|  | VGG + GRU | P, L, S, LC, GC | 0.89 | 0.87 | 0.81 | 0.81 | 0.81 |
| Ours | VGG + C3D + GRU | P, L, S, LC, GC, SC, B, R | 0.91 | 0.89 | 0.84 | 0.85 | 0.83 |

13

Comparison metrics that were used in these comparisons are accuracy, AUC, and F1-score. ACC is prediction accuracy. AUC is a lower area in a receiver operation characteristic (ROC) curve, and is defined like Equation 13.

$$AUC(f) = \sum_{t_0 \in D^0} \sum_{t_1 \in D^1} \frac{1[f(t_0) < f(t_1)]}{|D^0| \cdot |D^1|} \qquad \text{[Equation 13]}$$

In Equation 13, f is a predictor that returns the crossing intention probability. $1[f(t_0) < f(t_1)]$ means an index function that returns 1 when $f(t_0) < f(t_1)$ and that returns 0 otherwise. $\mathcal{D}^0$ is a negative sample set. $\mathcal{D}^1$ is a positive sample set. When AUC is high, this indicates that the model can effectively distinguish between classes.

F1-score is a coordinated average of accuracy and a recall factor, and is defined like Equation 14.

$$F1 = \frac{2 \times precision \times recall}{precision + recall} \qquad \text{[Equation 14]}$$

Furthermore, in Table 1, P means pose feature information of a pedestrian. L means bounding box information of the pedestrian. S means ego-vehicle speed information. Furthermore, LC means local context information, GC means global context information, SC means scene context information, B means local box information, and R means local surround information from which local box information has been removed.

A network according to an embodiment of the present disclosure has the greatest differences from the existing other benchmark models in that the network uses both the VGG and C3D networks with respect to image features as visual encoders and can efficiently process the most input features.

The existing first to third methods (SingleRNN, Multi-RNN, and SERNN) uses the VGG network as the visual encoder in common.

The existing first method (SingleRNN) showed performance of 0.76/0.64/0.45, that is, the lowest values in Accuracy/AUC/F1 scores, respectively, in a way to concatenate bounding box information (bounding box) and ego-vehicle speed information as one vector. The existing second method (MultiRNN) showed relatively performance of 0.86/0.80/0.73 in the Accuracy/AUC/F1 scores, respectively, by using only four input features in a way to output the uncertainty of prediction through Bayesian modeling. The existing third method (SFRNN) is a method of using the hidden state of a lower layer RNN as the input of an upper layer RNN.

In the existing fourth and fifth methods (PCPA and MCIP), result values of the C3D, I3D, and VGG networks were extracted by using the visual encoder.

The existing fourth method (PCPA) showed the lowest performance of 0.86/0.85/0.77 in the Accuracy/AUC/F1 scores, respectively, when the C3D network was used as the visual encoder, and showed the highest performance of 0.87/0.86/0.79 in the Accuracy/AUC/F1 scores, respectively, when feature information was encoded by using the I3D network. The existing fifth method (MCIP) used a total of five inputs, including input features that were used in the existing fourth method (PCPA) and a segmentation map input additionally. Furthermore, unlike in the existing fourth method (PCPA), in terms of performance aspects, the existing fifth method (MCIP) had the lowest performance of 0.85/0.81/0.74, that is, the results of encoding using the I3D network, in the Accuracy/AUC/F1 scores, respectively, and showed the highest performance of 0.89/0.87/0.81 in the Accuracy/AUC/F1 scores, respectively, when feature information was encoded by using the VGG network.

In contrast, in an embodiment of the present disclosure, visual input feature information are divided into two groups. The visual input feature information included in one of the two groups was encoded by using the VGG network, and the visual input feature information included in the other of the two groups was encoded by using the C3D network. Furthermore, the network has been designed to use eight input features, that is, the greatest inputs compared to the existing methods, so that feature information can be efficiently processed. The network has proven excellence of the present disclosure because the network showed performance of 0.91/0.89/0.84, that is, the highest values, in the Accuracy/AUC/F1 scores, respectively, compared to the existing benchmark methods.

Table 2 shows the results of comparisons between the influences of inputs on the entire performance by comparing performance when the influences are removed one by one with respect to each input feature in an embodiment of the present disclosure. In this case, inputs to the bounding box information had the greatest influence on accuracy, and showed low performance of 0.063/0.043/0.084 in the Accuracy/AUC/F1 scores, respectively. Inputs that had the least influence on performance are scene context information, and showed only a performance drop of about 0.010/0.004/0.013 in the Accuracy/AUC/F1 scores, respectively. It is determined that the inputs had not great influence on prediction because not a specific portion of the image, but the entire portion of an image was used. Accordingly, it may be seen that the best performance was obtained only when all of the eight inputs were used.

TABLE 2

| P | L | S | LC | GC | SC | B | R | ACC | AUC | F1 | Accuracy | Recall |
|---|---|---|----|----|----|---|---|-----|-----|----|----------|--------|
| ✓ | ✓ | ✓ | ✓ | ✓ | ✓ | ✓ | ✓ | 0.911 | 0.888 | 0.843 | 0.851 | 0.834 |
|  | ✓ | ✓ | ✓ | ✓ | ✓ | ✓ | ✓ | 0.855 | 0.871 | 0.782 | 0.686 | 0.910 |
|  |  |  |  |  |  |  |  | (−0.0065) | (−0.0017) | (−0.0061) | (−0.165) | (+0.076) |
| ✓ |  |  | ✓ | ✓ | ✓ | ✓ | ✓ | 0.848 | 0.845 | 0.759 | 0.693 | 0.839 |
|  |  |  |  |  |  |  |  | (−0.0063) | (−0.0043) | (−0.0084) | (−0.158) | (+0.005) |
| ✓ | ✓ |  | ✓ | ✓ | ✓ | ✓ | ✓ | 0.857 | 0.836 | 0.758 | 0.730 | 0.789 |
|  |  |  |  |  |  |  |  | (−0.0054) | (−0.0052) | (−0.0085) | (−0.121) | (−0.045) |
| ✓ | ✓ | ✓ |  | ✓ | ✓ | ✓ | ✓ | 0.887 | 0.868 | 0.806 | 0.788 | 0.824 |
|  |  |  |  |  |  |  |  | (−0.0024) | (−0.0020) | (−0.0037) | (−0.063) | (−0.010) |
| ✓ | ✓ | ✓ | ✓ |  | ✓ | ✓ | ✓ | 0.898 | 0.876 | 0.822 | 0.820 | 0.824 |
|  |  |  |  |  |  |  |  | (−0.0013) | (−0.0012) | (−0.0021) | (−0.031) | (−0.010) |

TABLE 2-continued

| P | L | S | LC | GC | SC | B | R | ACC | AUC | F1 | Accuracy | Recall |
|---|---|---|----|----|----|---|---|-----|-----|-----|----------|--------|
| ✓ | ✓ | ✓ | ✓ | ✓ |  | ✓ | ✓ | 0.901 (−0.0010) | 0.884 (−0.0004) | 0.830 (−0.0013) | 0.816 (−0.035) | 0.844 (+0.010) |
| ✓ | ✓ | ✓ | ✓ | ✓ | ✓ |  | ✓ | 0.888 (−0.0023) | 0.879 (−0.0009) | 0.814 (−0.0029) | 0.773 (−0.078) | 0.859 (+0.025) |
| ✓ | ✓ | ✓ | ✓ | ✓ | ✓ | ✓ | 0.859 (−0.0052) | 0.876 (−0.0012) | 0.788 (−0.0055) | 0.692 (−0.159) | 0.915 (+0.081) |

Furthermore, in an embodiment of the present disclosure, visual inputs are divided into two groups based on their features and are encoded by using the VGG and C3D networks. From Table 3, it may be seen that performance drops when the visual inputs included in the C3D group are encoded by using the VGG network. It may be seen that the greatest performance drop was about 0.02/0.02/0.03 in the Accuracy/AUC/F1 scores, respectively. Accordingly, it was proven that a method of dividing the visual inputs for each group and separately perform visual encoding, which is proposed in the present disclosure, is effective in improving prediction performance.

TABLE 3

| Model | VGG | C3D | ACC | AUC | F1 |
|-------|-----|-----|-----|-----|-----|
| Ours(B/R-VGG) | LC, GC, SC, B, R |  | 0.90 | 0.88 | 0.82 |
| Ours(B-VGG) | LC, GC, SC, B | B | 0.90 | 0.89 | 0.83 |
| Ours(R-VGG) | LC, GC, SC, R | B | 0.89 | 0.87 | 0.81 |
| Ours | LC, GC, SC | B, R | 0.91 | 0.89 | 0.84 |

Table 4 shows the results of comparisons between performance of a model to which the system proposed in an embodiment of the present disclosure has been applied and performance of the existing model while changing a prediction time from one second to four seconds. The model according to an embodiment of the present disclosure shows performance results that are higher than or partially identical with performance results of the existing model with respect to all prediction time. A time when performance had the greatest difference was predicted after one second. Accuracy/AUC/F1-score of the model according to an embodiment of the present disclosure were improved to 0.02/0.02/0.03 compared to the existing model.

TABLE 4

|  | Existing | | | Present disclosure | | |
|------|------|------|------|------|------|------|
| Time | ACC | AUC | F1 | ACC | AUC | F1 |
| 4 s | 0.78 | 0.74 | 0.62 | 0.78 | 0.74 | 0.61 |
| 3 s | 0.79 | 0.77 | 0.66 | 0.8 | 0.8 | 0.7 |
| 2 s | 0.83 | 0.81 | 0.72 | 0.84 | 0.83 | 0.74 |
| 1 s | 0.89 | 0.87 | 0.81 | 0.91 | 0.89 | 0.84 |

Furthermore, in an embodiment of the present disclosure, annotation that is included in the existing dataset was added and expanded by the automatic labeling technique and was used in learning. Table 5 shows experiment results from which the feasibility of the automatic labeling technique according to an embodiment of the present disclosure can be checked, and shows the results of performance comparisons between a dataset (auto label) version on which only automatic labeling was purely performed and a version (human correction) obtained by performing, by a person, verification on the dataset (auto label) version again. As a result of the experiments, it was proven that the automatic labeling scheme according to an embodiment of the present disclosure could have sufficient performance through only automatic labeling although a small performance difference of about 0.01/0.00/0.01 in the Accuracy/AUC/F1 scores, respectively, was present compared to the dataset on which human verification was performed.

TABLE 5

| Dataset | ACC | AUC | F1 | Accuracy | Recall |
|---------|-----|-----|-----|----------|--------|
| Auto Label | 0.88 | 0.85 | 0.92 | 0.95 | 0.90 |
| Human Correction | 0.89 | 0.85 | 0.93 | 0.95 | 0.91 |

Table 6 shows performance comparisons according to an increase of data that were subjected to automatic labeling. If the number of data that had been automatically labeled with respect to a training set was increased up to a total of 140 data while increasing the number of data from 60 data by 20 data, performance indices of respective training sets were compared. When the number of training sets was 60, Accuracy/AUC/F1 scores were sequentially 0.78/0.76/0.85. As the number of training sets was gradually increased, performance was gradually improved. When the number of training sets was 140, Accuracy/AUC/F1 scores of 0.88/0.85/ 0.92, that is, the highest performance, were reached. Accordingly, it was proven that prediction performance was improved as more data subjected to automatic labeling were added to the training set.

TABLE 6

| # of train set | ACC | AUC | F1 | Accuracy | Recall |
|----------------|-----|-----|-----|----------|--------|
| 60 | 0.78 | 0.76 | 0.85 | 0.92 | 0.79 |
| 80 | 0.79 | 0.80 | 0.86 | 0.94 | 0.79 |
| 100 | 0.83 | 0.85 | 0.89 | 0.96 | 0.82 |
| 120 | 0.86 | 0.84 | 0.91 | 0.95 | 0.87 |
| 140 | 0.88 | 0.85 | 0.92 | 0.95 | 0.90 |

Figure 7:
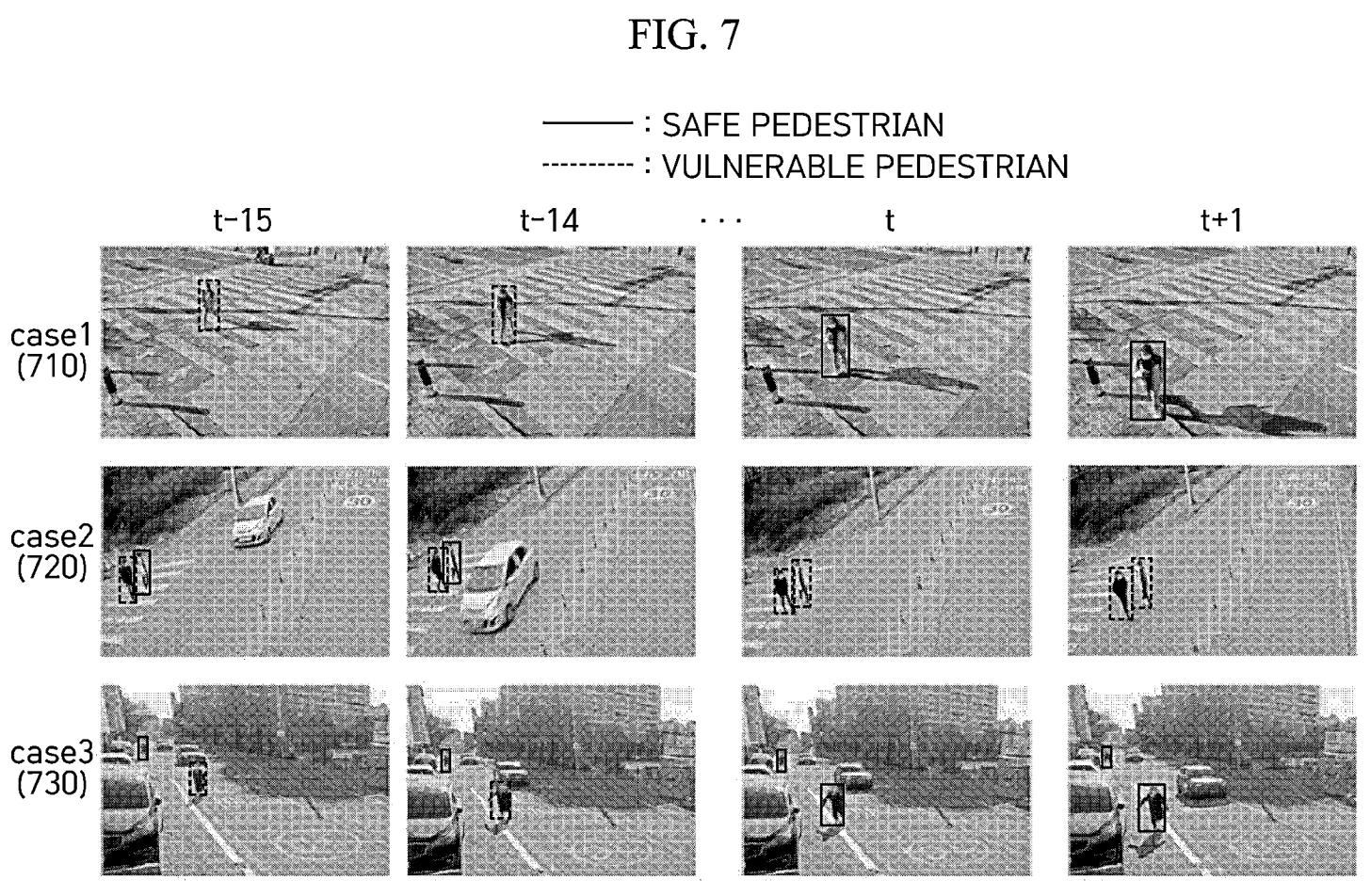

FIG. 7 is a diagram for describing qualitative analysis results of pedestrian prediction results based on an image captured by CCTV in an embodiment of the present disclosure.

FIG. 7 shows qualitative analysis of the results of the execution of the model that is proposed in the present disclosure in an NIA dataset (an image of a child road walking risk behavior within a school zone). A solid line box means the prediction of a pedestrian who is safe. A dotted line box means the prediction of a pedestrian who is vulnerable to safety. Case1 710 shows that a student who crosses a crosswalk is vulnerable to safety when the student is in the crosswalk, but is predicted as a pedestrian who is safe as the student approached a sidewalk. Case2 720 shows that two students are predicted as pedestrians who are gradually vulnerable to safety as the two students entered a roadway. Finally, Case3 730 shows that a student is pre-dicted as a pedestrian who is vulnerable to safety when the student run from a roadway within a school zone, but is predicted as a pedestrian who is safe as the student enters a sidewalk. Accordingly, it can be seen that a pedestrian who is vulnerable to safety is predicted in advance through the present disclosure. Furthermore, as in Case2 720 and Case 3 730 of FIG. 7, it can be seen that pedestrian behavior prediction information on multiple pedestrians can be simul-taneously generated and can be simultaneously displayed as a bounding box. Furthermore, a pedestrian can be continu-ously tracked in real time through continuous prediction even after prediction timing through the grafting of such a method with the automatic labeling technique.

Figure 8:
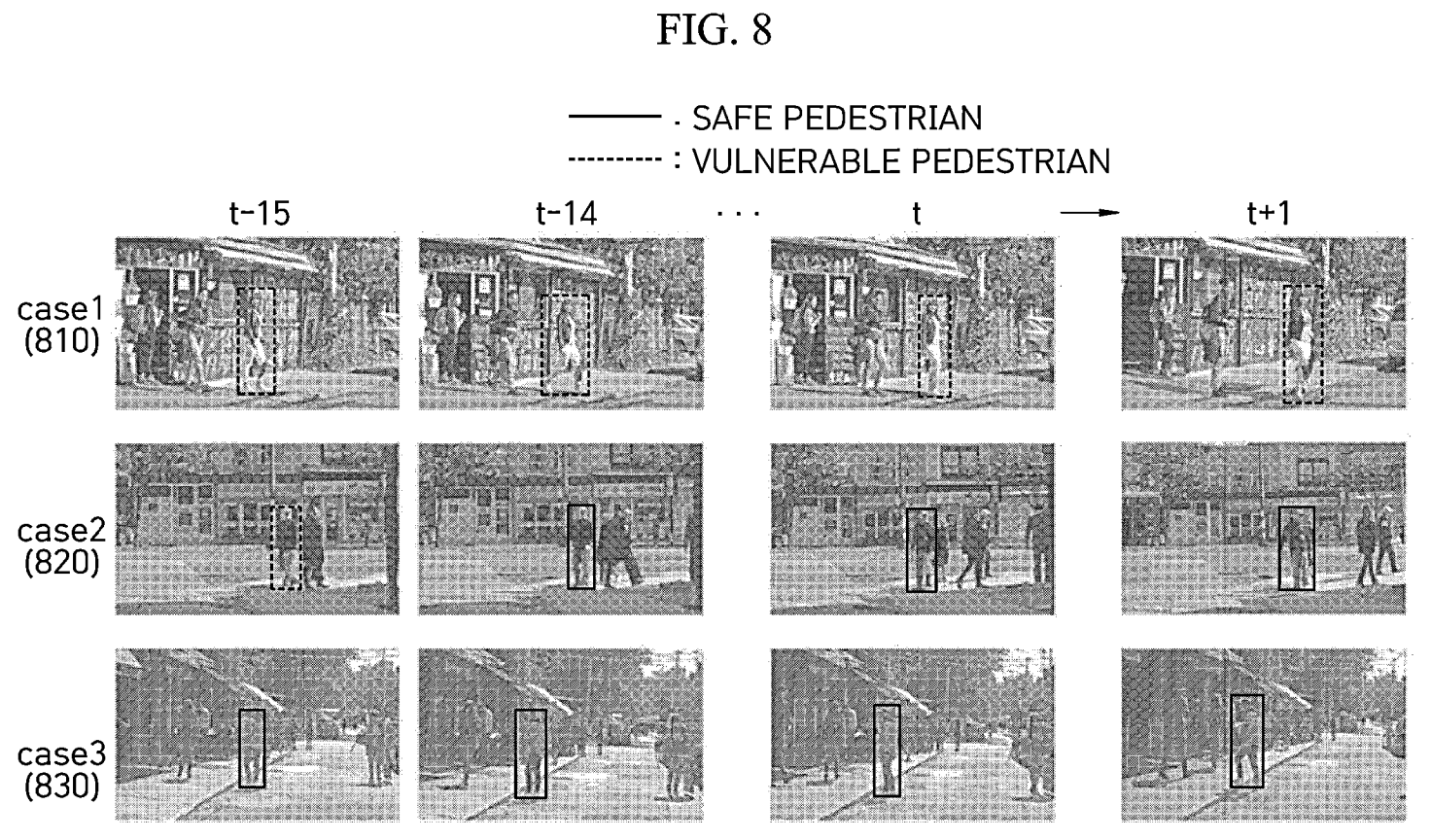

FIG. 8 is a diagram for describing other qualitative analysis results of pedestrian prediction results based on an image captured in an ego-vehicle in an embodiment of the present disclosure.

FIG. 8 illustrates qualitative analysis of the results of the execution of the model that is proposed in the present disclosure in a PIE dataset (an image of a behavior of a pedestrian, which is captured in a vehicle). As illustrated in FIG. 7, a solid line box means the prediction of a pedestrian who is safe. A dotted line box means the prediction of a pedestrian who is vulnerable to safety. Case1 810 is a case in which a pedestrian who tried to enter a roadway is continuously predicted as a pedestrian who is vulnerable to safety. Case2 820 is a case in which a pedestrian is first predicted as a pedestrian who is vulnerable to safety as the pedestrian entered a crosswalk, but is predicted as the pedestrian who is safe as the pedestrian gradually stopped. Case3 830 is a case in which a pedestrian who is in a roadway is continuously predicted as a pedestrian who is safe as the pedestrian went up to a sidewalk. Accordingly, it can be seen that a pedestrian who is vulnerable to safety is predicted with respect to an image that is captured in an ego-vehicle.

It may be expected that the embodiments of the present disclosure will be used in a service using a smart safety road system capable of preventing an accident by giving attention or warning to a vehicle or a pedestrian in advance when finding a pedestrian who is predicted to be in a situation in which the pedestrian is vulnerable to safety in children/ elderly/disabled people protection zones in the future.

The aforementioned embodiment of the present disclo-sure may be implemented in the form of a program (or application) in order to be executed by being combined with a computer, that is, hardware, and may be stored in a medium.

The aforementioned program may include a code coded in a computer language, such as C, C++, JAVA, Ruby, or a machine language which is readable by a processor (CPU) of a computer through a device interface of the computer in order for the computer to read the program and execute the methods implemented as the program. Such a code may include a functional code related to a function, etc. that defines functions necessary to execute the methods, and may include an execution procedure-related control code neces-sary for the processor of the computer to execute the functions according to a given procedure. Furthermore, such a code may further include a memory reference-related code indicating at which location (address number) of the memory inside or outside the computer additional informa-tion or media necessary for the processor of the computer to execute the functions needs to be referred. Furthermore, if the processor of the computer requires communication with any other remote computer or server in order to execute the functions, the code may further include a communication-related code indicating how the processor communicates with the any other remote computer or server by using a communication module of the computer and which infor-mation or media needs to be transmitted and received communication.

The medium in which the method is stored means a medium that semi-permanently stores data and that is read-able by a device, not a medium that stores data for a short moment like a register, a cache, or memory. Specifically, examples of the medium in which the method is stored include ROM, RAM, CD-ROM, a magnetic tape, a floppy disk, optical data storage, etc., but the present disclosure is not limited thereto. That is, the program may be stored in various recording media in various servers which may be accessed by a computer or various recording media in a computer of a user. Furthermore, the medium may be distributed to computer systems connected over a network, and a code readable by a computer in a distributed way may be stored in the medium.

The description of the present disclosure is illustrative, and a person having ordinary knowledge in the art to which the present disclosure pertains will understand that the present disclosure may be easily modified in other detailed forms without changing the technical spirit or essential disclosure. characteristic of the present Accordingly, it should be construed that the aforementioned embodiments are only illustrative in all aspects, and are not limitative. For example, elements described in the singular form may be carried out in a distributed form. Likewise, elements described in a distributed form may also be carried out in a combined form.

The scope of the present disclosure is defined by the appended claims rather than by the detailed description, and all changes or modifications derived from the meanings and scope of the claims and equivalents thereto should be interpreted as being included in the scope of the present disclosure.

What is claimed is:

1. A method of generating pedestrian behavior prediction information, the method being performed by a computer and comprising:

setting image information from present to a certain time in a past as a target observation image;

extracting multiple visual input feature information and non-visual input feature information from the target observation image;

grouping the multiple visual input feature information and non-visual input feature information; and inputting the grouped feature information to separated processing modules and generating pedestrian behavior prediction information by concatenating output results of the processing modules;

wherein the extracting of the multiple visual input feature information and non-visual input feature information from the target observation image comprises:

extracting pose feature information of a pedestrian, bounding box information of the pedestrian, and speed information of a vehicle as the non-visual input feature information; and extracting, as the visual input feature information, local context information, which is an image with a size that is a certain multiple of the bounding box information, global context information comprising image segmen-tation information, scene context information compris-ing entire area information of the image, local box information obtained from the image information, and local surround information from which the local box information has been removed;

wherein the grouping of the multiple visual input feature information and non-visual input feature information comprises:

generating the pose feature information of the pedestrian, the bounding box information of the pedestrian, and the speed information of the vehicle as first group feature information;

generating the local context information that is an image of the bounding box information, which has the size that is the certain multiple, the global context information comprising the image segmentation information, and the scene context information comprising the entire area information of the image as second group feature information; and generating the local box information obtained from the image information and the local surround information from which the local box information has been removed as third group feature information; and wherein the inputting of the grouped feature information into the separated processing modules and generating pedestrian behavior prediction information by concatenating the output results of the processing modules comprises:

inputting the local context information, the global context information, and the scene context information to a convolutional neural network (CNN).

2. The method of claim 1, wherein the inputting of the grouped feature information into the separated processing modules and generating pedestrian behavior prediction information by concatenating the output results of the processing modules comprises:

inputting the pose feature information of the pedestrian to a first gate recurrent unit (GRU) module;

obtaining a dynamic feature value of the pose feature information of the pedestrian from the first GRU module;

inputting the dynamic feature value of the pose feature information of the pedestrian and the bounding box information of the pedestrian to a second GRU module by concatenating the dynamic feature value and the bounding box information;

obtaining a dynamic feature value of results of an operation of the bounding box information and pose feature information of the pedestrian from the second GRU module;

inputting the dynamic feature value of the results of the operation of the bounding box information and pose feature information of the pedestrian and the speed information of the vehicle to a third GRU module by concatenating the dynamic feature value and the speed information; and obtaining a dynamic feature value of results of an operation of the bounding box information and pose feature information of the pedestrian and the speed information of the vehicle from the third GRU module.

3. The method of claim 1, wherein the inputting of the grouped feature information into the separated processing modules and generating pedestrian behavior prediction information by concatenating the output results of the processing modules comprises:

inputting, to the first to third GRU modules, pieces of image feature information of the local context information, the global context information, and the scene context information output from the CNN, respectively; and inputting prediction information of each of the local context information, the global context information, and the scene context information output from the first to third GRU modules to a fourth GRU module by concatenating the prediction information.

4. The method of claim 1, wherein the inputting of the grouped feature information into the separated processing modules and generating pedestrian behavior prediction information by concatenating the output results of the processing modules comprises:

inputting the local box information obtained from the image information and the local surround information from which the local box information has been removed to a convolution three-dimensional (3-D) network;

reducing a dimension of each image by inputting output results of the convolution 3-D network to a max pooling layer;

converting each image having the dimension reduced into a first dimension vector and transferring the first dimension vector to a fully connected layer; and outputting results of a concatenation of input and output neurons in the fully connected layer.

5. The method of claim 1, wherein the inputting of the grouped feature information into the separated processing modules and generating of the behavior prediction information of the pedestrian by concatenating the output results of the processing modules comprises:

inputting output results of a first processing module for processing first group information to a first attention module;

inputting output results of a second processing module for processing second group information to a second attention module;

inputting output results of the second attention module to a third attention module after being concatenated with third group information; and generating pedestrian behavior prediction information by inputting output results of the first to third attention modules to a fourth attention module after concatenating the output results.

6. The method of claim 1, further comprising automatically labeling whether the pedestrian is at risk with respect to all frames of the image information based on the generated behavior prediction information of the pedestrian.

7. The method of claim 1, wherein in the generating pedestrian behavior prediction information, the behavior prediction information of all pedestrians included in the image information is generated in real time and simultaneously displayed as video results.

8. A system for generating pedestrian behavior prediction information, the system comprising:

a communication module configured to receive image information obtained through a camera;

memory in which a program for generating pedestrian behavior prediction information based on the image information has been stored; and a processor configured to set image information during a predetermined frame from a present to a past as target observation image, extract multiple visual input feature information and non-visual input feature information from the target observation image, group the multiple visual input feature information and non-visual input feature information, and input the grouped feature information to separated processing modules and generating pedestrian behavior prediction information by concatenating output results of the processing modules, by executing the program stored in the memory;

wherein the processor extracts pose feature information of a pedestrian, bounding box information of the pedestrian, and speed information of a vehicle as the non-visual input feature information, and extracts, as the visual input feature information, local context information that is an image of the bounding box information having a predetermined multiple size, global context information comprising image segmentation information, scene context information comprising entire area information of the image, local box information obtained from the image information, and local surround information from which the local box information has been removed;

wherein the processor generates the pose feature information of the pedestrian, the bounding box information of the pedestrian, and the speed information of the vehicle as first group feature information, generates the local context information that is the image of the bounding box information, which has the predetermined multiple size, the global context information comprising the image segmentation information, and the scene context information comprising the entire area information of the image as second group feature information, and generates the local box information obtained from the image information and the local surround information from which the local box information has been removed as third group feature information; and wherein the processor inputs the local context information, the global context information, and the scene context information to a convolutional neural network (CNN).

9. The system of claim 8, wherein the processor inputs the pose feature information of the pedestrian to a first gate recurrent unit (GRU) module and obtains a dynamic feature value of the pose feature information of the pedestrian from the first GRU module, inputs the dynamic feature value of the pose feature information of the pedestrian and the bounding box information of the pedestrian to a second GRU module by concatenating the dynamic feature value and the bounding box information and obtains a dynamic feature value of results of an operation of the bounding box information and pose feature information of the pedestrian from the second GRU module, and inputs the dynamic feature value of the results of the operation of the bounding box information and pose feature information of the pedestrian and the speed information of the vehicle to a third GRU module and obtains a dynamic feature value of results of an operation of the bounding box information and pose feature information of the pedestrian and the speed information of the vehicle from the third GRU module.

10. The system of claim 8, wherein the processor inputs, to the first to third GRU modules, pieces of image feature information of the local context information, the global context information, and the scene context information output from the CNN, respectively, and inputs prediction information of each of the local context information, the global context information, and the scene context information output from the first to third GRU modules to a fourth GRU module by concatenating the prediction information.

11. The system of claim 8, wherein the processor inputs the local box information obtained from the image information and the local surround information from which the local box information has been removed to a convolution three-dimensional (3-D) network, reduces a dimension of each image by inputting output results of the convolution 3-D network to a max pooling layer, converts each image having the dimension reduced into a first dimension vector and transfers the first dimension vector to a fully connected layer, and outputs results of a concatenation of input and output neurons in the fully connected layer.

12. The system of claim 8, wherein the processor inputs output results of a first processing module for processing a first group information to a first attention module, inputs output results of a second processing module for processing a second group information to a second attention module, inputs output results of the second attention module to a third attention module after being concatenated with third group information, and generates the behavior prediction information of the pedestrian by inputting output results of the first to third attention modules to a fourth attention module after concatenating the output results.

13. The system of claim 8, wherein the processor automatically labels whether the pedestrian is at risk with respect to all frames of the image information based on the generated pedestrian behavior prediction information.

14. The system of claim 8, wherein the processor generates the behavior prediction information of all pedestrians included in the image information in real time and simultaneously displays the behavior prediction information of all the pedestrians as video results.

* * * * *